US012565435B2

(12) United States Patent
Zhou et al.

(10) Patent No.: US 12,565,435 B2
(45) Date of Patent: Mar. 3, 2026

(54) INTEGRATED DUAL CIRCULATION OXIDIZATION DITCH APPARATUS FOR MUNICIPAL WASTEWATER AND TREATMENT METHOD

(71) Applicant: GUIZHOU UNIVERSITY, Guizhou (CN)

(72) Inventors: Shaoqi Zhou, Guizhou (CN); Yanwu Zhou, Guizhou (CN); Feng Chen, Guizhou (CN); Juan Zhou, Guizhou (CN); Dan Chen, Guizhou (CN)

(73) Assignee: GUIZHOU UNIVERSITY, Guizhou (CN)

( * ) Notice: Subject to any disclaimer, the term of this patent is extended or adjusted under 35 U.S.C. 154(b) by 658 days.

(21) Appl. No.: 17/956,853

(22) Filed: Sep. 30, 2022

(65) Prior Publication Data

US 2023/0024100 A1 Jan. 26, 2023

Related U.S. Application Data

(63) Continuation of application No. PCT/CN2021/103283, filed on Jun. 29, 2021.

(30) Foreign Application Priority Data

Jun. 24, 2021 (CN) .......................... 202110707990.2

(51) Int. Cl.
*C02F 3/30* (2023.01)
*C02F 1/00* (2023.01)
(Continued)

(52) U.S. Cl.
CPC ............ *C02F 3/302* (2013.01); *C02F 3/1257* (2013.01); *C02F 3/308* (2013.01);
(Continued)

(58) Field of Classification Search
CPC ........ C02F 3/302; C02F 3/1257; C02F 3/308; C02F 2001/007; C02F 2101/16;
(Continued)

(56) References Cited

U.S. PATENT DOCUMENTS

| | | | | |
|---|---|---|---|---|
| 3,837,493 A | * | 9/1974 | Lin | .................... B01D 21/2427 |
| | | | | 210/197 |
| 6,030,528 A | | 2/2000 | Han | |
| 2017/0088450 A1 | * | 3/2017 | Syron | ..................... B01F 27/91 |

FOREIGN PATENT DOCUMENTS

| | | |
|---|---|---|
| CN | 101186390 | 5/2008 |
| CN | 101628775 | 1/2010 |

(Continued)

OTHER PUBLICATIONS

"International Search Report (Form PCT/ISA/210) of PCT/CN2021/103283", mailed on Feb. 28, 2022, pp. 1-5.
(Continued)

*Primary Examiner* — Ekandra S. Miller-Cruz
(74) *Attorney, Agent, or Firm* — JCIPRNET

(57) ABSTRACT

Disclosed are an integrated dual circulation oxidization ditch apparatus for municipal wastewater and a treatment method. The apparatus comprises an anaerobic zone, an anoxic zone, an aerobic zone and a secondary sedimentation tank communicated in sequence. The anoxic zone comprises a first anoxic zone and a second anoxic zone. The aerobic zone comprises a first aerobic zone and a second aerobic zone, and a reflux pump is arranged between the anoxic zone and the aerobic zone. The anaerobic zone, the anoxic zone and the aerobic zone are internally provided with submersible mixers. Both the anoxic zone and the aerobic zone are internally provided with partition walls and guide walls, thereby forming circulation in each zone.

9 Claims, 6 Drawing Sheets

(51) Int. Cl.
    *C02F 3/12*          (2023.01)
    *C02F 101/16*        (2006.01)
(52) U.S. Cl.
    CPC .... *C02F 2001/007* (2013.01); *C02F 2101/16*
          (2013.01); *C02F 2203/006* (2013.01); *C02F*
                          *2301/046* (2013.01)
(58) Field of Classification Search
    CPC .......... C02F 2203/006; C02F 2301/046; C02F
                          3/1278; C02F 3/301; Y02W 10/10
    USPC ........................................................ 210/605
    See application file for complete search history.

(56)                    References Cited

FOREIGN PATENT DOCUMENTS

| | | |
|---|---|---|
| CN | 101844829 | 9/2010 |
| CN | 102001787 | 4/2011 |
| CN | 201942599 | 8/2011 |
| CN | 201952322 | 8/2011 |
| KR | 20130122192 | 11/2013 |

OTHER PUBLICATIONS

Yuanshuang Luo et al., "Efficient municipal wastewater treatment by oxidation ditch process at low temperature: Bacterial community structure in activated sludge", Science of the Total Environment, vol. 703, Feb. 2020, pp. 1-9.

* cited by examiner

INTEGRATED DUAL CIRCULATION OXIDIZATION DITCH APPARATUS FOR MUNICIPAL WASTEWATER AND TREATMENT METHOD

CROSS-REFERENCE TO RELATED APPLICATIONS

This application is a continuation of international PCT application serial no. PCT/CN2021/103283, filed on Jun. 29, 2021, which claims the priority benefit of China application serial no. 202110707990.2, filed on Jun. 24, 2021. The entirety of each of the above-mentioned patent applications is hereby incorporated by reference herein and made a part of this specification.

TECHNICAL FIELD

The present invention belongs to the field of wastewater treatment, in particular to an integrated dual circulation oxidization ditch apparatus for municipal wastewater and a treatment method.

BACKGROUND

With rapid development of social economy and daily increase of population, consumption of resources and energy sources are accelerated to a certain extent. Industrialized development, unreasonable pasturing and the like cause continuous deterioration of a water environment, which leads to shortage of available fresh water resources. The water supply problem is turned into a problem demanding prompt solution in many countries.

Shortage of the water sources threatens development of human society severely. Recovery and recycle of wastewater are considered an optimum policy of a water demand at present and in the future. As the environmental awareness of the public and the government, the wastewater treatment capacity of China is improved rapidly, too. Wastewater treatment includes primary and second treatment and sometimes further includes an advanced treatment process, adopting different biological, physical and chemical technologies. At present, wastewater treatment processes used by wastewater treatment plants in China include a conventional activated sludge process, anaerobic-anoxic-aerobic (A2/O), anaerobic-aerobic (A/O), a sequencing batch reactor (SBR), an oxidization ditch and the like. The treatment efficiency of the wastewater treatment plant is not only related to the process but also related to scale of the wastewater treatment plant. The discharge efficiency of wastewater and the treatment efficiency of the wastewater treatment facility are different in different regions. Influence of different treatment technologies on sludge utilization is on the rise in China. As a result of a heterogeneous characteristic of economic development, the economic growth in the east is rapider, in particular Zhejiang and Jiangsu. The variability depends on many factors, including a huge population size (14.1 hundred million), fast economic growth and deficiencies in industrialization, urbanization and infrastructure investment in China. However, government investment is primarily used for construction and operation of the wastewater treatment plants and has the defects of long construction period, high expense, high energy consumption and the like. Thus, the defects mean that the wastewater treatment plants cannot meet the discharge standard required.

With acceleration of urbanization and industrialization processes, a lot of nutritional substances containing nitrogen and phosphorus exist in household wastewater discharged, which leads to quick breeding of algae and other planktons and accelerates eutrophication of water, thereby bringing great harm to healthy of people and the aquatic environment. Therefore, researches on nitrogen and phosphorus removal technologies for household wastewater are widely concerned and focused by the water treatment industry. Thus, the present invention aims to provide the integrated dual circulation oxidization ditch apparatus for municipal wastewater which is low in energy consumption and economical and applicable and a use method.

Luo et al has researched gene sequencing of bacterial community characteristics of an oxidization ditch system of the wastewater treatment plant which operates well in cold regions (Xinjiang) by adopting a high throughput 16srrna technology by taking activated sludge of some urban wastewater treatment plant as a research object. A result shows that the water inlet temperatures in winter and spring range from 7° C. to 12° C. and the water inlet temperature in summer ranges from 13° C. to 17° C., and the sludge volume index (SVI) of a sample range from 51 ml/g to 74 ml/g. Chemical oxygen demand (COD), average removal rate of biochemical oxygen demand (BOD5), suspended solids (SS), ammonium nitrogen ($NH_4^+$—N), total nitrogen (TN) and total phosphorus are 94%, 95%, 95%, 91%, 73% and 89% respectively. The COD, BOD5, NH4+-N, TN and total phosphorus in the research are 94.2%, 98.26%, 98.25%, 72.2% and 91.87% respectively. Except for slight lower total nitrogen parameter value, parameter values of other indexes are higher than those in the research of Luo et al (Efficient municipal wastewater treatment by oxidation ditch process at low temperature: Bacterial community structure in activated sludge).

SUMMARY

In order to solve the problem of ammonia nitrogen load in household wastewater and a water body environment and reduction of high COD, BOD, ammonia nitrogen, TN and TP water inlet concentration of comprehensive wastewater, it is thereof an object of the present invention to provide an integrated dual circulation oxidization ditch apparatus device for municipal wastewater which can reduce the ammonia nitrogen load effectively, and the treated wastewater can be supplemented and reused as circulating water.

The object of the present invention is at least realized by one of the technical schemes as follows:

An integrated dual circulation oxidization ditch apparatus for municipal wastewater includes an anaerobic zone, an anoxic zone, an aerobic zone and a secondary sedimentation tank, the anoxic zone including a first anoxic zone and a second anoxic zone, the aerobic zone comprising a first aerobic zone and a second aerobic zone, and a reflux pump being arranged between the anoxic zone and the aerobic zone. In the anoxic zone, the wastewater mixed liquid input by the anaerobic zone is input via the internal reflux pump, under an action of the submersible mixer, the refluxed sludge containing a lot of nitric nitrogen in the aerobic zone is mixed, a purpose of removing nitric nitrogen in the wastewater mixed liquid mixed stably is achieved in adsorption and metabolic processes of the organic matters by denitrifying bacteria, and thereby, a removal effect of ammonia nitrogen and total nitrogen is promoted.

Preferably, the anaerobic zone is provided with a water inlet, a first connection port is formed between the anaerobic zone and the anoxic zone, a second connection port is formed between the anoxic zone and the aerobic zone, and a third connection port is formed between the aerobic zone and the secondary sedimentation tank.

Further preferably, the first connection port is formed in a lower end of a partition wall between the anaerobic zone and the anoxic zone, the second connection port is formed in a lower end of a partition wall between the anoxic zone and the aerobic zone, and the third connection port is formed in a lower end of a partition wall between the aerobic zone and the secondary sedimentation tank and between the anaerobic zone and the anoxic zone.

Preferably, a first guide wall is arranged between the first anoxic zone and a second anoxic zone, a second guide wall is arranged between the first aerobic zone and the second aerobic zone, a partition wall is arranged between the aerobic zones, the partition walls of the first aerobic zone and the second aerobic zone are provided with self-suction plug-flow aerators respectively to form circular flow between the first aerobic zone and the second aerobic zone, and an aeration fan is arranged between the aerobic zones for aeration of an aerobic tank, thereby achieving effects of enhancing nitrogen and phosphorus removal and removing organic pollutants. The self-suction plug flow aeration machine is arranged at two ends of the partition wall of the aerobic zone, which can save the energy consumption of the aeration fan and can shorten the maintenance time and reduce the maintenance cost in the operating process of the aeration system.

Preferably, the aerobic zone is provided with the aeration fan for aeration of an aerobic tank.

Preferably, the secondary sedimentation tank is provided with a water outlet channel, a sludge outlet and emptying pipe and a reflux channel, the water outlet channel is provided with a water outlet, a sludge reflux pipe is arranged between the reflux channel and the anaerobic zone, the water outlet channel and the reflux channel are arranged at two ends of an upper portion of the secondary sedimentation tank.

Preferably, a bottom of the secondary sedimentation tank is provided with an emptying pipeline for sludge discharge or maintenance. The treatment zones are constructed integrally, and the wastewater mixed liquid is conveyed with the connection ports, such that the construction occupied area of buildings and the pipeline paving quantity are reduced, and meanwhile, the loss of water head is reduced, construction of intermediate lifting facilities is reduced and the investment and operation costs are lowered.

Preferably, the anaerobic zone is internally provided with a first submersible mixer, the anoxic zone is internally provided with a second submersible mixer, and the aerobic zone is provided with a third submersible mixer;

and preferably, an internal reflux pump employs a propeller type pump with a large flow and a small lift. The reflux energy consumption is reduced in the operating process, and the apparatus can be mounted on the tank wall, such that the investment of constructing a reflux pump station is saved.

Preferably, the water outlet channel is provided with a catchwater channel that plays a role of collecting a supernatant obtained by sludge-water separation in the secondary sedimentation tank to the water outlet channel, the secondary sedimentation tank is internally provided with a foam scraping and rope sucking machine, and the apparatus is provided with a sludge reflux pump used for refluxing sludge to the reflux channel.

Preferably, the sludge after sludge-water separation is settled to a lower middle portion of the secondary sedimentation tank, and a sludge pump lifts the sludge to the reflux channel in a process that the foam scraping and rope sucking machine moves in a reciprocating manner. A sludge reflux pipe is arranged between the reflux channel and the anaerobic zone and plays a role of forming a reflux by means of a liquid level difference between the reflux channel and the anaerobic zone, thereby lowering the construction investment and the operating cost of constructing the reflux pump house.

A wastewater treatment method that employs the integrated dual circulation oxidization ditch apparatus for municipal wastewater includes the following steps:

(a) mixing wastewater with refluxed sludge in the secondary sedimentation tank in the anaerobic zone, conducting anaerobic treatment on a mixture, and then feeding the mixture into the anoxic zone;

(b) mixing the wastewater mixed liquid in the step (a) with a refluxed liquid in the aerobic zone in the anoxic zone, conducting anaerobic treatment on a mixture, and then feeding the mixture into the aerobic zone;

(c) conducting aerobic treatment on the wastewater mixed liquid in the step (b) in the aerobic zone, refluxing the wastewater mixed liquid to the anoxic zone and feeding the wastewater mixed liquid in to secondary sedimentation tank; and (d) discharging the supernatant from the water outlet after the wastewater mixed liquid in the step (c) is settled in the secondary sedimentation tank, and refluxing the settled sludge to the anaerobic zone.

Preferably, the wastewater mixed liquid in the anoxic zone flows circularly between a first anoxic zone and a second anoxic zone; and preferably the wastewater mixed liquid in the aerobic zone flows circularly between a first aerobic zone and a second aerobic zone.

Preferably, under a plug flow action of the submersible mixer, phosphorus-accumulating particles in the wastewater mixed liquid in the anaerobic zone are released in a metabolic process of organic matters by anaerobic bacteria by means of an anaerobic environment, and thereby, a necessary condition is provided for an excessive phosphorus absorbing process in the aerobic zone;

under an action of the submersible mixer, a purpose of removing nitric nitrogen in the wastewater mixed liquid mixed in the anoxic zone is achieved in adsorption and metabolic processes of the organic matters by denitrifying bacteria by means of an anaerobic environment, and thereby, a removal effect of ammonia nitrogen and total nitrogen is promoted;

under an action of the submersible mixer, a purpose of removing BOD and $COD_{cr}$ carbon source pollutants in the sewage mixed liquid in the aerobic zone is achieved in adsorption and metabolic processes of the organic matters by an aerobic flora and meanwhile, carbon dioxide and water are generated; phosphorus-accumulating bacteria are adsorbed to suspended solids in the wastewater mixed liquid and precipitate substances formed in a biochemical process after excessively absorbing element phosphorus released in the anaerobic environment by the aerobic environment; nitrogen source pollutants in the wastewater mixed liquid are refluxed to the anoxic zone via the internal reflux pump after being converted into nitric nitrogen in the aerobic environment by means of nitrification; and a flow area of the wastewater mixed liquid entering the secondary sedimentation tank is increased greatly, a flow rate thereof is reduced, the sludge is settled, and the supernatant obtained by sludge-water separation enters the water outlet channel after being collected via the catchwater channel and is then discharged to a clean water basin from the water outlet via a drainage pipeline; and the sludge after sludge-water separation is settled to a lower middle portion of the secondary sedimentation tank, and a sludge pump lifts the sludge to the reflux channel in a process that the foam scraping and rope sucking machine moves in a reciprocating manner.

In the present invention, treated by the dual circulation oxidization ditch apparatus, the COD (chemical oxygen demand) average concentration is decreased from 341.5 mg/L to 19.7 mg/L, the average removal rate is 94.2%, and the COD load of a wastewater station is reduced; the BOD average concentration is decreased from 149.6 mg/L to 2.58 mg/L, and the average removal rate is 98.2%; the ammonia nitrogen average concentration is decreased from 33.4 mg/L to 0.57 mg/L, the average removal rate is 98.2%, the TN average concentration is decreased from 41.7 mg/L to 11.4 mg/L, and the average removal rate is 72.2%; and the TP average concentration is decreased from 3.17 mg/L to 0.24 mg/L, and the average removal rate is 91.8%.

Compared with the prior art, the present invention has the advantages and benefits that (1) The integrated dual circulation oxidization ditch apparatus for municipal wastewater in the present invention has the characteristics of easy operation and low cost, can further reduce the investment and operation costs and improve the economic benefit;

(2) The present invention reduces original COD, BOD and concentration of ammonia nitrogen, TN and TP entering the wastewater plant and improves the removal rate of the wastewater effectively, thereby creating a proper condition for subsequent nitrogen removal treatment of the wastewater.

SYMBOL DESCRIPTION IN THE DRAWINGS

A1—anaerobic zone, B1—first anoxic zone, B2—second anoxic zone, C3—first aerobic zone, C4—second aerobic zone, D—secondary sedimentation tank;

1—water inlet, 2—first submersible stirrer, 3—first connection port, 4—second submersible stirrer, 5—first guide wall, 6—second connection port, 7—reflux pump, 8—plug flow aeration machine, 9—second guide wall, 1—third submersible stirrer, 11—aeration fan, 12—third connection port, 13—sludge outlet and emptying pipe, 14—reflux channel, 15—sludge reflux pipe, 16—foam scraping and rope sucking machine, 17—catchwater channel, 18—water outlet channel.

DETAILED DESCRIPTION

Further description of the present invention will be made below in combination with drawings and embodiments, but the embodiments do not limit the protection scope of the present invention.

Example 1

Figure 1:
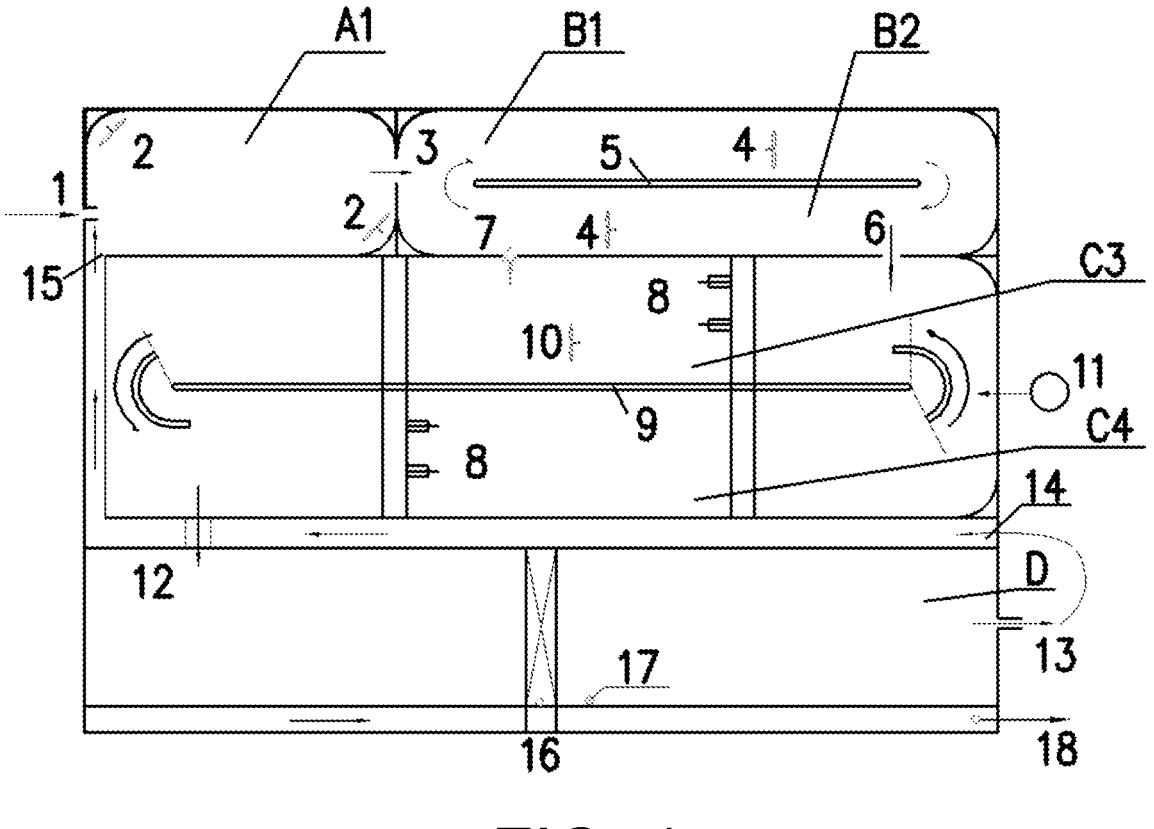
FIG. 1 is a device diagram of the integrated dual circulation oxidization ditch apparatus for municipal wastewater of the present invention.
Figure 2:
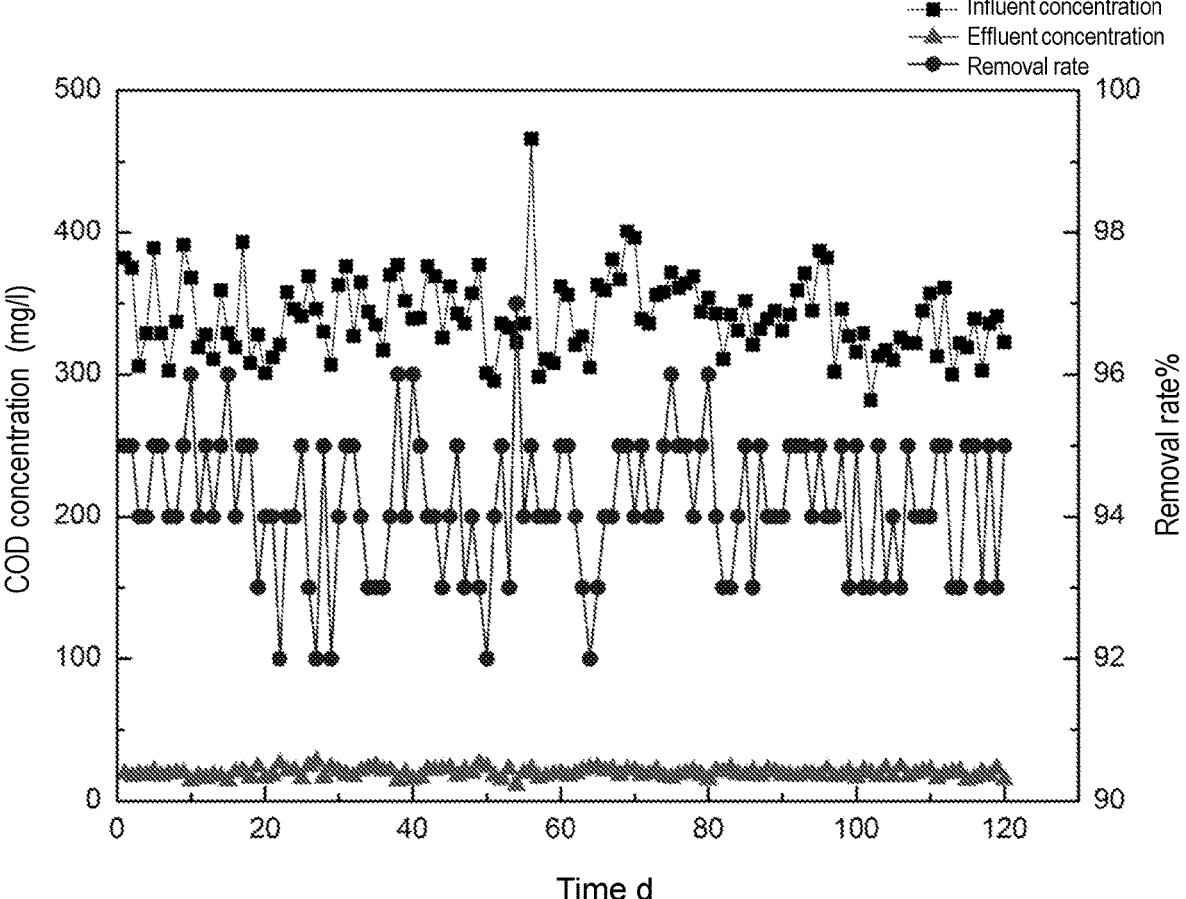
FIG. 2 is a COD concentration variation diagram of the integrated dual circulation oxidization ditch apparatus for municipal wastewater of the present invention started in 120 days.
Figure 3:
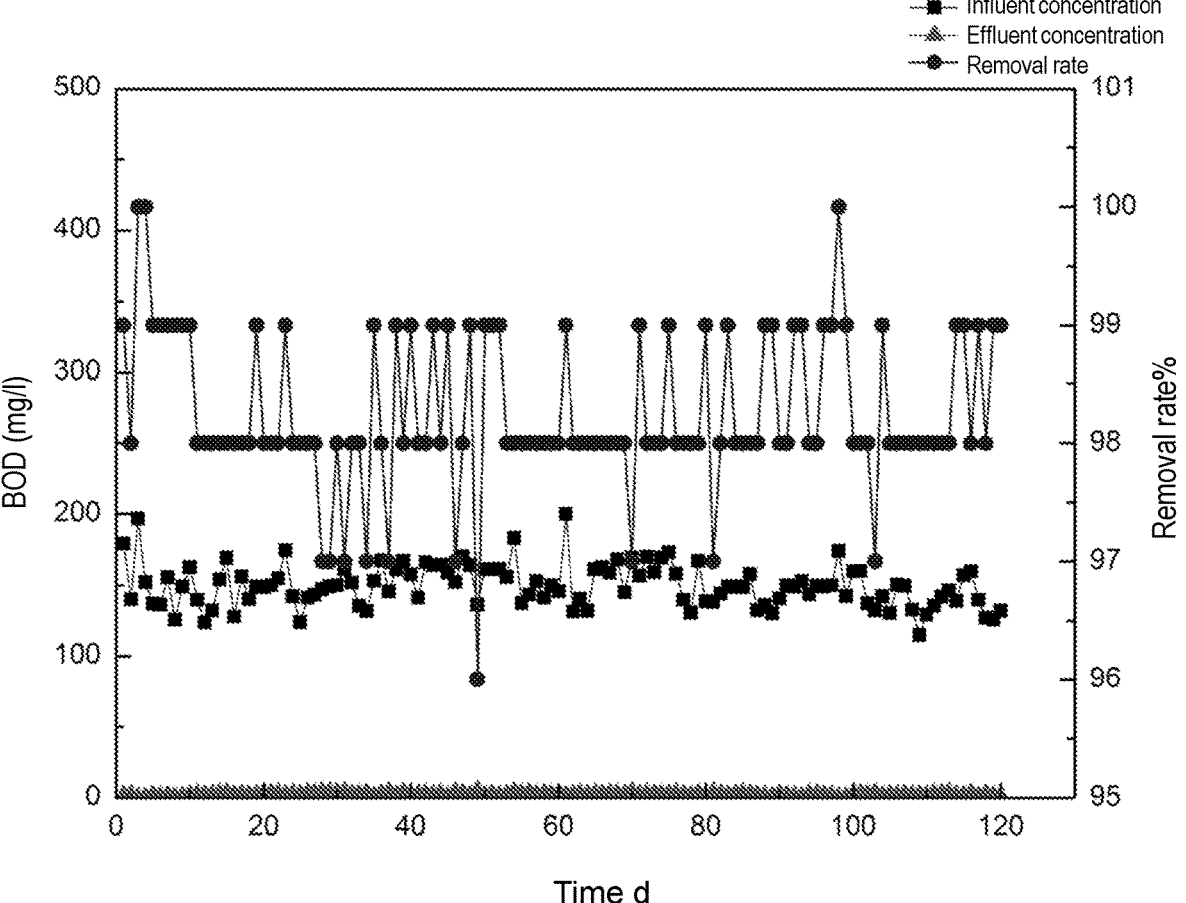
FIG. 3 is a BOD concentration variation diagram of the integrated dual circulation oxidization ditch apparatus for municipal wastewater of the present invention started in 120 days.
Figure 4:
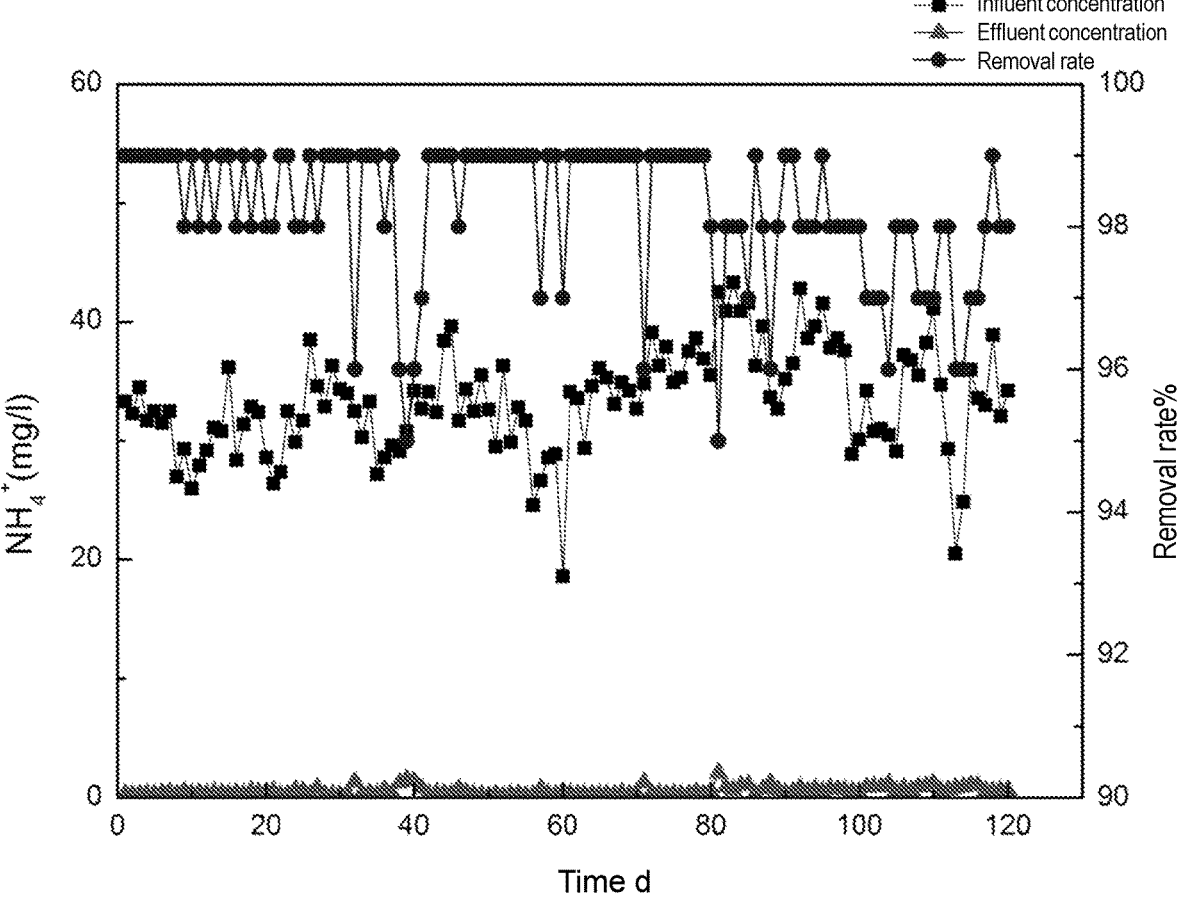
FIG. 4 is an ammonia nitrogen concentration variation diagram of the integrated dual circulation oxidization ditch apparatus for municipal wastewater of the present invention started in 120 days.
Figure 5:
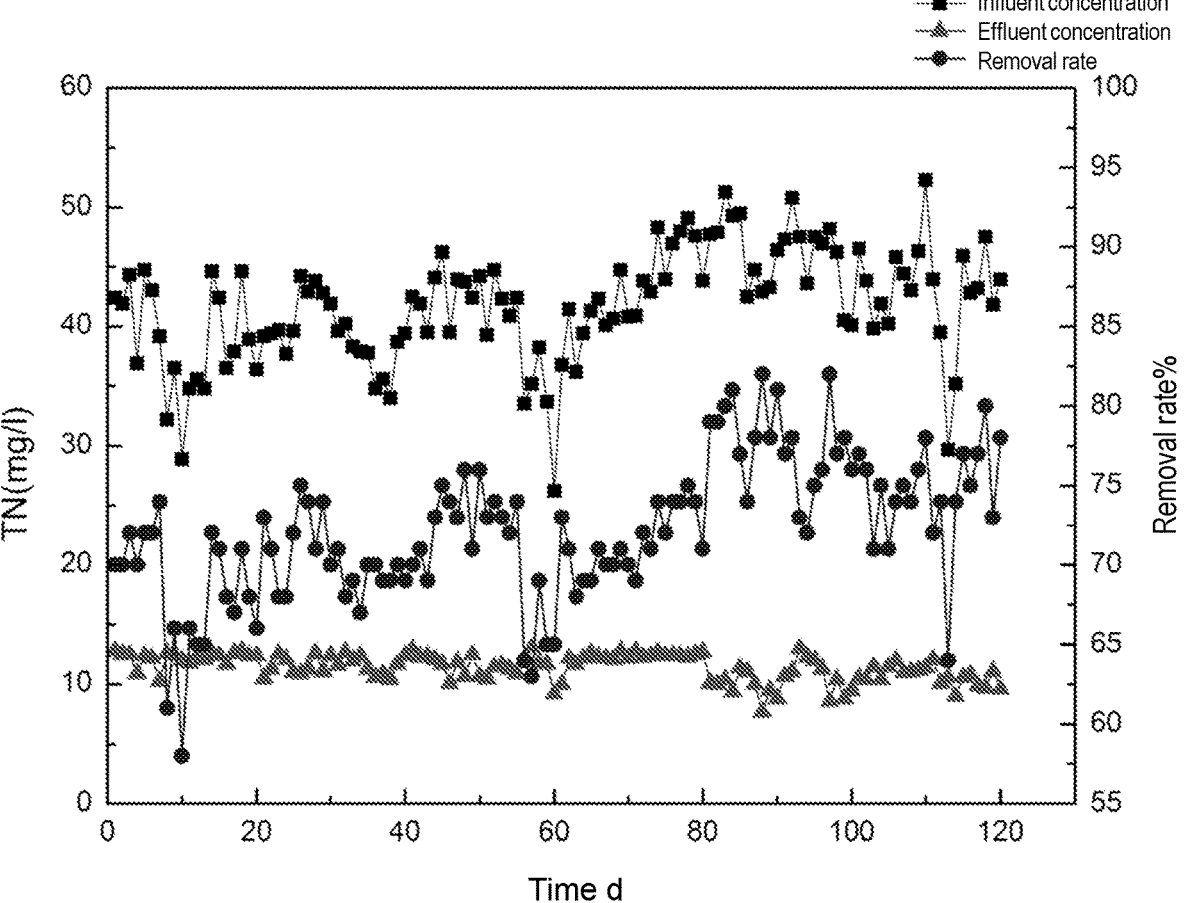
FIG. 5 is a TN concentration variation diagram of the integrated dual circulation oxidization ditch apparatus for municipal wastewater of the present invention started in 120 days.
Figure 6:
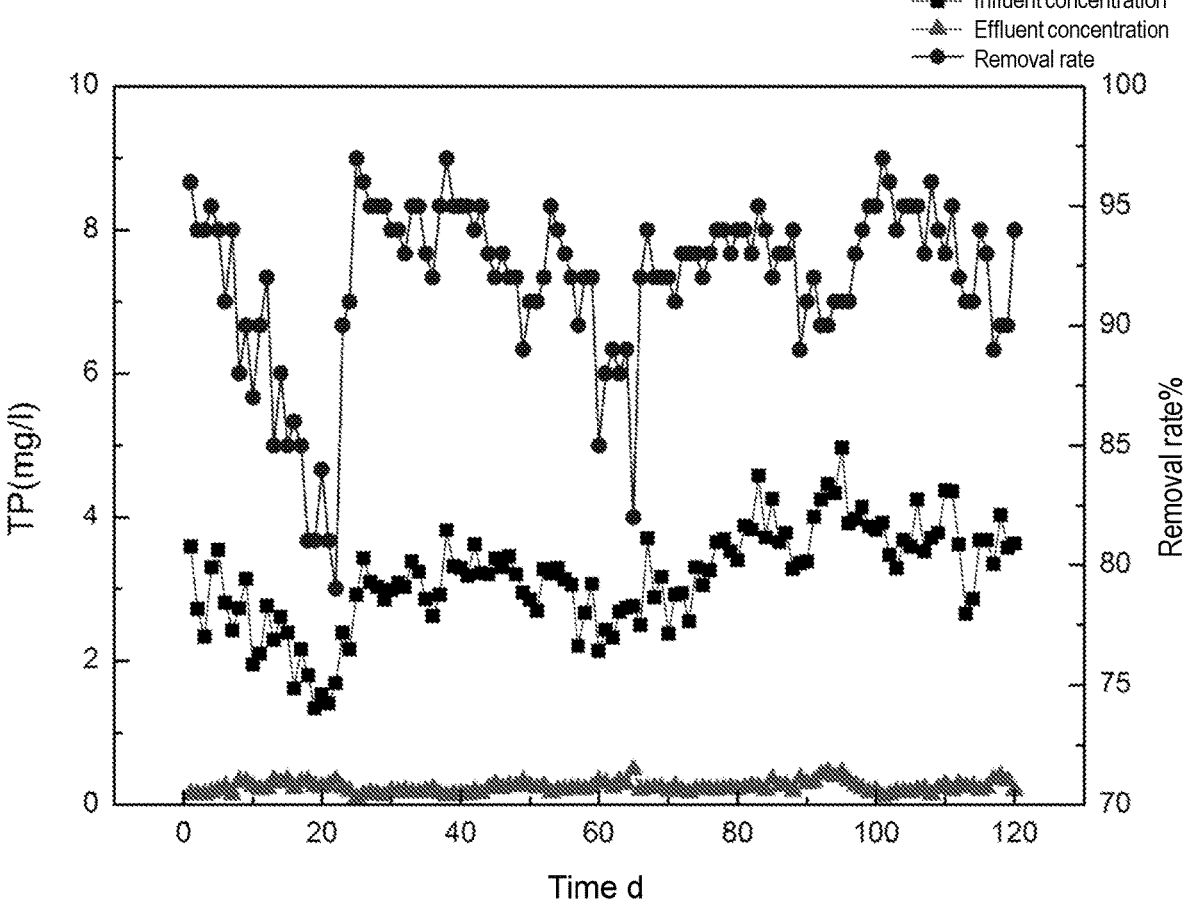
FIG. 6 is a TP concentration variation diagram of the integrated dual circulation oxidization ditch apparatus for municipal wastewater of the present invention started in 120 days.

The integrated dual circulation oxidization ditch apparatus for municipal wastewater as shown in the FIG. 1 includes the anaerobic zone A1, the anoxic zones (B1, B2), the aerobic zones (C3, C4) and the secondary sedimentation tank D, the anoxic zones (B1, B2) including the first anoxic zone B1 and the second anoxic zone B2, the aerobic zones (C3, C4) including the first aerobic zone C3 and the second aerobic zone C4;

the anaerobic zone A1 is provided with the water inlet 1, the first connection port 3 is formed between the anaerobic zone A1 and the anoxic zones (B1, B2), the second connection port 6 is formed between the anoxic zones (B1, B2) and the aerobic zones (C3, C4), and the third connection port 12 is formed between the aerobic zones (C3, C4) and the secondary sedimentation tank D; the anoxic zone (B1, B2) is internally provided with the first guide wall 5, the aerobic zones (C3, C4) are internally provided with the second guide wall 9, two partition walls are arranged between the aerobic zones (C3, C4), the two auto-suction plug flow aeration machines 8 are additionally arranged at two ends of the partition walls respectively, the secondary sedimentation tank D is provided with the water outlet channel 18, the sludge outlet and emptying pipe 13 and the reflux channel 14, and the water outlet channel 18 and the reflux channel 14 are arranged at two ends of the upper portion of the secondary sedimentation tank D; the water outlet channel 18 is provided with the water outlet, the sludge reflux pipe 15 is arranged between the reflux channel 14 and the anaerobic zone A1, and the bottom of the secondary sedimentation tank D is provided with the emptying pipeline; the treatment zones are constructed integrally, and the wastewater mixed liquid is conveyed with the connection ports, such that the construction occupied area of buildings and the pipeline paving quantity are reduced, and meanwhile, the loss of water head is reduced, construction of intermediate lifting facilities is reduced and the investment and operation costs are lowered.

The anaerobic zone A1, the anoxic zones (B1, B2) and the aerobic zones (C3, C4) are internally provided with the first submersible mixer 2, the second submersible mixer 4 and the third submersible mixer 10 respectively;

the partition walls of the aerobic zones (C3, C4) and the anoxic zones (B1, B2) are provided with the internal reflux pumps 7, and the internal reflux pumps 7 employ the propeller type pumps with large flows and low lifts, such that the reflux energy consumption is reduced in the operating process, and the apparatus can be mounted on the tank wall, and therefore, the investment of constructing a reflux pump station is saved;

The partition wall is arranged between the aerobic zones (C3, C4), aeration systems with the self-suction plug flow aeration machines are arranged at two ends of the partition wall of the aerobic zone, and the self-suction plug flow aeration machines 8 are arranged at two ends of the partition walls of the aerobic zones (C3, C4), which can save the energy consumption of the aeration fan and can shorten the maintenance time and reduce the maintenance cost in the operating process of the aeration system. The aerobic zone is provided with the aeration fan 11 for aeration of the aerobic tank.

The water outlet channel 18 is provided with the catch-water channel 17 that plays a role of collecting a supernatant obtained by sludge-water separation in the secondary sedimentation tank to the water outlet channel;

and the secondary sedimentation tank is internally provided with the foam scraping and rope sucking machine 16, and the apparatus is provided with a sludge reflux pump used for refluxing sludge to the reflux channel 14.

Example 2

The wastewater treatment method that employs the integrated dual circulation oxidization ditch apparatus for municipal wastewater includes the following steps:

1) under a plug flow action of the first submersible mixer 2, phosphorus-accumulating particles in the wastewater mixed liquid in the anaerobic zone A1 are released in a metabolic process of organic matters by anaerobic bacteria by means of the anaerobic environment, and thereby, a further necessary condition is provided for an excessive phosphorus absorbing process in the aerobic zone; a sludge concentration needed in the integrated dual circulation oxidization ditch biochemical process is ensured by the wastewater mixed liquid via the reflux pipe 15; and the wastewater mixed liquid after the anaerobic treatment process then enters the anoxic zones (B1, B2) via the first connection port 3;

in the anoxic zones (B1, B2), the wastewater mixed liquid input by the anaerobic zone A1 is input via the internal reflux pump 7, under the action of the submersible mixer 4, the refluxed sludge containing a lot of nitric nitrogen in the aerobic zones (C3, C4) is mixed, a purpose of removing nitric nitrogen in the wastewater mixed liquid mixed stably is achieved in adsorption and metabolic processes of the organic matters by denitrifying bacteria, and thereby, a removal effect of ammonia nitrogen and total nitrogen is promoted; and under the push action of the submersible mixer 4, the wastewater mixed liquid after the anaerobic treatment process then enters the aerobic zones (C3, C4) via the second connection port 6;

3) under an action of the third submersible mixer 10, a purpose of removing BOD and CODcr carbon source pollutants in the sewage mixed liquid in the aerobic zones (C3, C4) is achieved in adsorption and metabolic processes of the organic matters by an aerobic flora and meanwhile, carbon dioxide and water are generated; the nitrogen source pollutants in the wastewater mixed liquid converted into nitric nitrogen by means of nitrification in the aerobic environment are refluxed to the anoxic zones (B1, B2) via the internal reflux pumps 7, i.e., after a circular repeated process of the step b, the purpose of removing the nitrogen source pollutants in the wastewater mixed liquid is achieved by means of nitrification and denitrification, and in the process, carbon dioxide, nitrogen, ammonia and water are generated; and meanwhile, phosphorus-accumulating bacteria are adsorbed to suspended solids in the wastewater mixed liquid and precipitate substances formed in the biochemical process after excessively absorbing element phosphorus released in the anaerobic environment by the aerobic environment, and furthermore, the phosphorus-accumulating bacteria are discharged together with sludge in the next step sludge-wastewater separation process; the generated gases are discharged out of the buildings; so far, via the sequential treatment processes in the anaerobic zone A1, the anoxic zones (B1, B2) and the aerobic zones (C3, C4), after circular repeated A2O biochemical treatment of the wastewater mixed liquid jointly finished by internal refluxing and residual sludge refluxing process proceeded simultaneously, pollutants in the wastewater mixed liquid are reduced, wherein the wastewater mixed liquid then enters into the secondary sedimentation tank D via the third connection port 12;

4) the flow area of the wastewater mixed liquid entering the secondary sedimentation tank D is increased greatly, the flow rate thereof is reduced, good biological flocs in the mixed liquid are formed, the sludge settling speed and the sludge-wastewater separation effect of the secondary sedimentation tank D is improved, and the supernatant obtained by sludge-wastewater separation enters the water outlet channel 18 after being collected via the catchwater channel 17 and is then discharged to the clean water basin from the water outlet via the drainage pipeline; and 5) the sludge after sludge-water separation is settled to the lower middle portion of the secondary sedimentation tank, and the sludge pump lifts the sludge to the reflux channel in the process that the foam scraping and rope sucking machine 16 moves in a reciprocating manner. The sludge reflux pipe 15 is arranged between the reflux channel 14 and the anaerobic zone A1 and plays a role of forming a reflux by means of a liquid level difference between the reflux channel 14 and the anaerobic zone A1, thereby lowering the construction investment and the operating cost of constructing the reflux pump house.

The embodiment employs a demonstration project of the newly designed integrated dual circulation oxidization ditch apparatus for municipal wastewater, a wastewater treatment scale is 10000 ton/day, a hydraulic retention time HRT is 8-12 days, a sludge age is STR=15-22 days, a mixed liquid concentration is MLSS=3000-4500 mg/l, a sludge load is Fw=0.1-02 KgBOD5/kg MLVSS, a reflux ratio refluxing from the aerobic zone C to the anoxic zone B is 100-150%, and a reflux ratio of the sludge is 50-100%.

It can be known from the FIG. 2, FIG. 3, FIG. 4, FIG. 5 and FIG. 6 that under a normal production condition, an original average COD concentration of the wastewater plant is 341.5 mg/L, a BOD average concentration thereof is 149.6 mg/L, an ammonia nitrogen average concentration thereof is 33.4 mg/L, a TN average concentration thereof is 41.7 mg/L and a TP average concentration thereof is 3.17 mg/L. After treatment by the device, the COD concentration is reduced greatly compared with that previously to 19.7 mg/L, the BOD average concentration of the wastewater is decreased to 2.58 mg/L greatly, the average ammonia nitrogen concentration is decreased to 0.57 mg/L greatly, the average TN concentration is decreased to 11.4 mg/L greatly and the average TP concentration is further decreased to 0.24 mg/L greatly. An average removal rate is increased from 72% to 98%, which is favorable for providing sufficient carbons sources for nitrogen removal by denitrification. The operating cost of the wastewater treatment station is lowered and the economic benefit is improved.

The denitrifying phosphorus removal action of nitric nitrogen is achieved in the anoxic zone, such that the purpose of removing COD of the organic pollutants and removing nitrogen and phosphorus is achieved stably, and thereby, the COD removal effect is improved, and both the nitrogen and phosphorus removal efficiencies by denitrifying phosphorous bacteria (DPB) are improved. A main pollutant index of an effluent of the tank body reaches or is superior to a national standard and a standard A; and integrated construction of the tank body has the characteristics of simple operation and low cost, such that the investment and the operating cost can be further reduced.

The embodiments are preferred modes of execution of the present invention. The modes of execution of the present invention are not limited by the embodiments. Any other changes, modifications, substitutions, combinations and simplifications made without departing from the spirit and principle of the present invention shall be equivalent substitute modes and shall come within the protection scope of the present invention.

What is claimed is:

1. An integrated dual circulation oxidization ditch apparatus for municipal wastewater, comprising an anaerobic zone, an anoxic zone, an aerobic zone and a secondary sedimentation tank, the anoxic zone comprising a first anoxic zone and a second anoxic zone, the aerobic zone comprising a first aerobic zone and a second aerobic zone, and a reflux pump being arranged between the anoxic zone and the aerobic zone, wherein the secondary sedimentation tank is provided with a water outlet channel, a sludge outlet and emptying pipe, and a reflux channel, the water outlet channel is provided with a water outlet, a sludge reflux pipe is arranged between the reflux channel and the anaerobic zone, the water outlet channel and the reflux channel are arranged at two ends of an upper portion of the secondary sedimentation tank, and a bottom of the secondary sedimentation tank is provided with an emptying pipeline for sludge discharge or maintenance.

2. The integrated dual circulation oxidization ditch apparatus for municipal wastewater according to claim 1, wherein the anaerobic zone is provided with a water inlet, a first connection port is formed between the anaerobic zone and the anoxic zone, a second connection port is formed between the anoxic zone and the aerobic zone, and a third connection port is formed between the aerobic zone and the secondary sedimentation tank.

3. The integrated dual circulation oxidization ditch apparatus for municipal wastewater according to claim 2, wherein the first connection port is formed in a lower end of a partition wall between the anaerobic zone and the anoxic zone, the second connection port is formed in a lower end of a partition wall between the anoxic zone and the aerobic zone, and the third connection port is formed in a lower end of a partition wall between the aerobic zone and the secondary sedimentation tank and between the anaerobic zone and the anoxic zone.

4. The integrated dual circulation oxidization ditch apparatus for municipal wastewater according to claim 1, wherein a first guide wall is arranged between the first anoxic zone and the second anoxic zone, a second guide wall is arranged between the first aerobic zone and the second aerobic zone, a partition wall is arranged between the aerobic zones, two ends of the partition wall of the first aerobic zone and the second aerobic zone are provided with self-suction plug-flow aerators respectively to form circular flow between the first aerobic zone and the second aerobic zone, and an aeration fan is arranged between the aerobic zones for aeration of an aerobic tank.

5. The integrated dual circulation oxidization ditch apparatus for municipal wastewater according to claim 1, wherein the anaerobic zone is internally provided with a first submersible mixer, the anoxic zone is internally provided with a second submersible mixer, and the aerobic zone is provided with a third submersible mixer; and an internal reflux pump employs a propeller pump.

6. The integrated dual circulation oxidization ditch apparatus for municipal wastewater according to claim 1, wherein the water outlet channel is provided with a catchwater channel that plays a role of collecting a supernatant obtained by sludge-water separation in the secondary sedimentation tank to the water outlet channel, the secondary sedimentation tank is internally provided with a foam scraping and a rope sucking machine, and the apparatus is provided with a sludge reflux pump used for refluxing sludge to the reflux channel.

7. A wastewater treatment method that employs the integrated dual circulation oxidization ditch apparatus for municipal wastewater according to claim 1, comprising the following steps:

(a) mixing wastewater with refluxed sludge in the secondary sedimentation tank in the anaerobic zone, conducting anaerobic treatment on a mixture, and then feeding the mixture into the anoxic zone;

(b) mixing the wastewater mixed liquid in the step (a) with a refluxed liquid in the aerobic zone in the anoxic zone, conducting anaerobic treatment on a mixture, and then feeding the mixture into the aerobic zone;

(c) conducting aerobic treatment on the wastewater mixed liquid in the step (b) in the aerobic zone, refluxing the wastewater mixed liquid to the anoxic zone and feeding the wastewater mixed liquid into the secondary sedimentation tank; and (d) discharging the supernatant from the water outlet after the wastewater mixed liquid in the step (c) is settled in the secondary sedimentation tank, and refluxing the settled sludge to the anaerobic zone.

8. The wastewater treatment method according to claim 7, wherein the wastewater mixed liquid in the anoxic zone flows circularly between the first anoxic zone and the second anoxic zone; and the wastewater mixed liquid in the aerobic zone flows circularly between the first aerobic zone and the second aerobic zone.

9. The wastewater treatment method according to claim 7, wherein under a plug flow action of a first submersible mixer, phosphorus-accumulating particles in the wastewater mixed liquid in the anaerobic zone are released in a metabolic process of organic matters by anaerobic bacteria by means of an anaerobic environment, and thereby, a necessary condition is provided for an excessive phosphorus absorbing process in the aerobic zone;

under an action of a second submersible mixer, a purpose of removing nitric nitrogen in the wastewater mixed liquid mixed in the anoxic zone is achieved in adsorption and metabolic processes of the organic matters by denitrifying bacteria by means of an anaerobic environment, and thereby, a removal effect of ammonia nitrogen and total nitrogen is promoted;

under an action of a third submersible mixer, a purpose of removing BOD and CODcr carbon source pollutants in the sewage mixed liquid in the aerobic zone is achieved in adsorption and metabolic processes of the organic matters by an aerobic flora and meanwhile, carbon dioxide and water are generated; phosphorus-accumulating bacteria are adsorbed to suspended solids in the wastewater mixed liquid and precipitate substances formed in a biochemical process after excessively absorbing element phosphorus released in the anaerobic environment by the aerobic environment; nitrogen source pollutants in the wastewater mixed liquid are refluxed to the anoxic zone via the internal reflux pump after being converted into nitric nitrogen in the aerobic environment by means of nitrification; and a flow area of the wastewater mixed liquid entering the secondary sedimentation tank is increased greatly, a flow rate thereof is reduced, the sludge is settled, and the supernate obtained by sludge-water separation enters the water outlet channel after being collected via a catchwater channel and is then discharged to a clean water basin from the water outlet via a drainage pipeline; and the sludge after sludge-water separation is settled to a lower middle portion of the secondary sedimentation tank, and a sludge pump lifts the sludge to the reflux channel in a process that the foam scraping and a rope sucking machine moves in a reciprocating manner.

* * * * *